United States Patent [19]
Levine

[11] 3,872,474
[45] Mar. 18, 1975

[54] AIRPORT GROUND SURVEILLANCE SYSTEM

[75] Inventor: Arnold M. Levine, Chatsworth, Calif.

[73] Assignee: International Telephone and Telegraph Corporation, New York, N.Y.

[22] Filed: Jan. 2, 1973

[21] Appl. No.: 320,089

[52] U.S. Cl. ............................................. 343/5 LS
[51] Int. Cl. ............................................... G01s 9/04
[58] Field of Search ...... 343/5 PD, 5 LS, 6 TV, 6 A

[56] References Cited
UNITED STATES PATENTS

| | | | |
|---|---|---|---|
| 2,536,496 | 1/1951 | Falloon | 343/5 LS X |
| 2,920,320 | 1/1960 | Ross | 343/5 LS X |
| 2,959,779 | 11/1960 | Miller et al. | 343/6 TV |
| 3,152,327 | 10/1964 | Barker | 343/5 PD |
| 3,188,386 | 6/1965 | Byatt | 343/6 TV X |
| 3,680,074 | 7/1972 | Lieser | 343/5 PD X |

*Primary Examiner*—Malcolm F. Hubler
*Attorney, Agent, or Firm*—William T. O'Neil

[57] ABSTRACT

A system for detecting, monitoring the movements of, and controlling the travel of aircraft and other vehicles on an airport surface. A series of small low-powered radar transmit-receive devices, each having a limited range, is disposed essentially in a line along alternate and opposite sides of a runway, ramp or taxiway. Control pulses at a system PRF travelling down the inter-connecting cables serve to cause the individual radars to "blink" in sequence in accordance with the inherent delay in the inter-connecting cable. Frequency separation is used to prevent false indications due to transmit-receive inter-action among the individual miniature radars. The system is adapted to data presentation in accordance with standard radar display techniques, or alternatively, a display is provided on a synthesized map of the airport. A pulse delay discriminator arrangement provides for discrete lateral position control. Means are also shown for televising the ground display to a vehicle on the surface and for providing discrete information such as a STOP order, etc.

9 Claims, 15 Drawing Figures

Fig. 1. FREQUENCY & RANGE SELECTION FOR TAXIWAY & RUNWAY GUIDANCE

Fig. 3.

Fig. 4. RUNWAY CROSS-SECTION

Fig. 5. RUNWAY—TAXIWAY SURVEILLANCE — SIMPLIFIED BLOCK DIAGRAM.

Fig. 5a.

TIME DIVISION SEQUENCING OF LOCAR PULSES

Fig. 14. BLOCK DIAGRAM—AIRCRAFT GUIDANCE SYSTEM

AIRPORT GROUND SURVEILLANCE SYSTEM

BACKGROUND OF THE INVENTION

1. Field of the Invention

The invention relates to electronic detection and control. More specifically, it relates to the surveillance and control of aircraft and other vehicular movements on the runways, ramps and taxiways of an airport.

2. Description of the Prior Art

Airports in major metropolitan areas throughout the world handle large volumes of air traffic, resulting in well-known conditions of congestion, not only in the approach air space, but also on the surface of the airport itself. All types of aircraft making use of an airport have occasion to use runways for landing and takeoff and taxiways to and from these runways. In addition, various ramps and approach ways leading to maintenance and parking areas and to passenger and freight terminal areas are traversed bidirectionally by aircraft of all sizes. In addition to the ground movement of aircraft, trucks and other ground vehicles performing specialized tasks on the surface of the airport. Accordingly, a major airport requires some form of overall ground traffic control system. In order to be effective, such systems must be sensitive to a number of variables.

The prior art systems have relied primarily on visual observation and direct radio communication for navigation and control of aircraft and vehicles on the surface of the airport. Pilots and vehicle operators provide their own visual guidance and collision avoidance, while air traffic control personnel issue clearances and information as necessary to maintain safe, orderly and expeditious flow of surface traffic. Whenever air traffic personnel are unable to completely observe traffic on runways and taxiways, etc. (because of darkness, natural or man-made obstructions, precipitation, fog, etc.), the control of ground traffic must necessarily be based only on reports from pilots and vehicle operators. Under these conditions, traffic cannot be controlled in such a way that airport runways, taxiways and gates are utilized efficiently. The result is a considerable increase in pilot and controller workload, radio frequency channel congestion, and operational delays.

Attempts have been made to provide radar coverage of the surface of an airport with high resolution surveillance radar sets operating in K-band and above. Such systems have been only partially successful however because of inability to locate a reasonable number of such surveillance equipments to eliminate shadowing caused by various structures about the airport surface. Also, the higher radar frequencies used to give sufficient resolution were adversely affected by hydrometeoric phenomena over the relatively long distances involved on the surfaces of modern airports.

The basic requirements for an all weather surface guidance and control system to fill the general requirement, can be stated as follows:

a. The system must provide aircraft and ground vehicles with information required for navigating within their movement areas during all weather conditions; this including the cability for locating and proceeding to a predetermined area or site anywhere on the airport surface.

b. The system must provide air traffic control personnel with information concerning the position of all aircraft and vehicles operating within the airport movement area and the relationship to each other as well as to runways, taxiways, intersections and fixed objects.

c. The system must provide an overall control system that is adapted to be expanded from a basic location system to a fully automatic routing system, ultimately with computer direction.

d. Additional equipment in aircraft and vehicles must be lightweight, compact and relatively inexpensive, as well as compatible with other equipment currently in use.

As aforementioned, visual and pilot reportage methods obviously cannot fulfill the aformentioned general requirements in all weather conditions. For reasons also given, the surface surveillance radars of the PPI type, or similar (usually employing the K-band), fall short of these requirements for reasons given.

The manner in which the present invention provides solutions to the problems of the prior art as discussed and fulfills the general requirements recited, will be apparent as this description proceeds.

SUMMARY OF THE INVENTION

The system of the present invention comprises a series of small, low powered, narrow pulse, transmitting and receiving radars having limited range (on the order of a runway or ramp width) and time sequenced along opposite sides of a runway. The system operates from a remote or master timing pulse generator having a predetermined pulse repetition frequency. During the interpulse period, each of these small radars "blinks" in sequence. The timing sequence takes place automatically due to the inherent delay in the coaxial cable furnishing the master timing pulse. Accordingly, no radio frequency transmission is made through the interconnecting cable, so relatively inexpensive cables such as video frequency coaxial cable can be used with little loss of signal characteristics. The individual small, low powered transmit-receive radar elements, hereinafter referred to as "LOCARS" (localized cable radar), are contained within a small igloo-shaped radome projecting above the ground surface only a minimal amount, so as not to present any hazard to aircraft or other vehicles.

In accordance with the foregoing, a more or less standard radar display may be synchronized by the master timing pulse, the relatively quickly received reply from each LOCAR blinks being transmitted in reverse polarity on the same cable as the snychronizing pulse referred to hereabove and, therefore, denoting the range along the runway or ramp, at which a vehicle is detected.

It may be said that the general objective of the present invention is the provision of an airport surface guidance and surveillance system providing features as follows:

1. Ability to track all vehicles on runways and taxi ramps in time sequence.
2. Vehicle tracking provided even if slightly airborne.
3. Capability of determining and indicating aircraft speed.
4. The system is easily displayed and relayed to pilots via standard closed circuit television (CCTV) technique.
5. Reduced interference (RFI).
6. Aircraft taxiway-runway guidance capability.
7. No concrete work on installation (low cost).
8. All weather.

9. Stationary vehicles as well as moving vehicles are indicated.
10. Independent of runway length.
11. No high power radiation near plane, passengers, or ground personnel.
12. No moving parts.

The manner in which the objectives and performance features of the system of the present invention are effected, as well as other capabilities and aspects of the novel system, will be described in greater detail hereinafter.

DESCRIPTION OF THE PREFERRED EMBODIMENT

Figure 1:
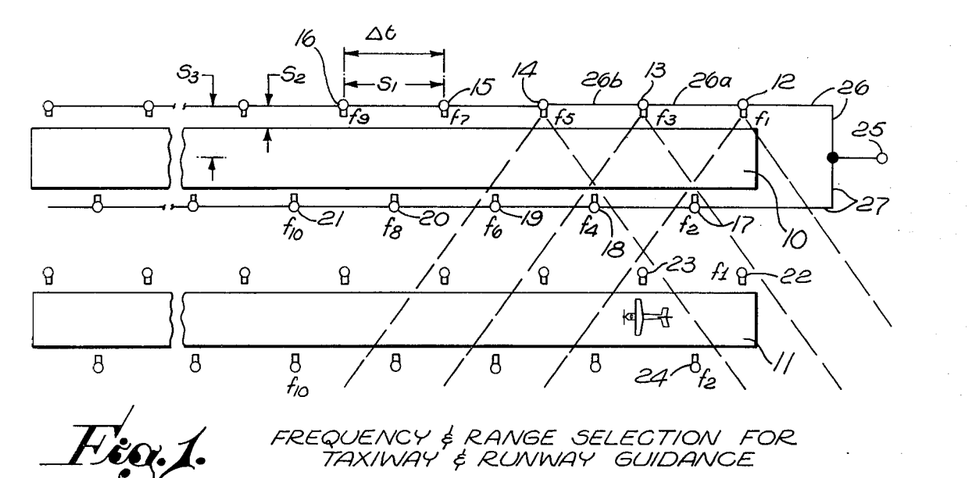
FIG. 1 is a typical parallel runway arrangement showing LOCAR units in place in accordance with the present invention.

FIGS. 1, 2, 3 and 4 of the drawings are devoted to illustration of a typical arrangement for locating the individual LOCAR units. In FIG. 1, two parallel runways are shown, this being a more or less typical runway configuration for a busy metropolitan airport. These runways are identified as 10 and 11, respectively. The individual LOCARS are distributed in two parallel off-set lines on opposite sides of the runway in each case. In connection with runway 10, more detail is illustrated as to the connection of the LOCARS with the video frequency trigger-pulse carrying cable, however it is to be understood that the similar arrangement would apply to runway 11.

One side of the runway 10 will be seen to be provided with LOCARS beginning with 12 which is approximately adjacent to the beginning or right end of the runway as depicted in FIG. 1. At equal intervals, LOCARS 13, 14, 15 and 16 and also the remaining units along that side of the runway are disposed. This spacing along the runway length dimension is identified on FIG. 1 as $S_1$. The corresponding time delay between adjacent LOCARS is identified as $\Delta t$. These values $S_1$ and $\Delta$ are not only typical of LOCAR unit spacing on that side of the runway, but also apply to LOCARS 17, 18, 19, 20, 21, etc. on the opposite side of the runway. One significant difference will be noted however, in that this second line of LOCARS is staggered with respect to the first line. That is to say, unit 17 has a location between units 12 and 13 in terms of spacing measured along the runway centerline.

As has been indicated, it is desired that the individual LOCARS transmit very short pulses, and that these pulses be spaced by the inherent trigger cable delay. The master timing pulse in the case of runway 10 is applied at 25, and this cable divides into two cables 26 and 27, which proceed down opposite sides of the runway as indicated in FIG. 1. Length between LOCARS (typically 26a and 26b) are equal. It will be evident from FIG. 1 that LOCAR unit number 12 would be the first to blink, followed by 17, 13, 18, 14, etc.

Although the cable feeds for the runway 11 are omitted from FIG. 1, it will be understood that the configuration is substantially identical to that illustrated for runway 10, except that the input to the elements disposed along-side runway 11 is timed subsequent to the completion of the total "scan" of runway 10. In effect, the LOCAR blinking of LOCARS 22, 24 and 23, and the remainder of the LOCARS along runway 11 in sequence, is accomplished by series connection of the cables from the end of runway 10 back to the beginning of runway 11.

Figure 2:
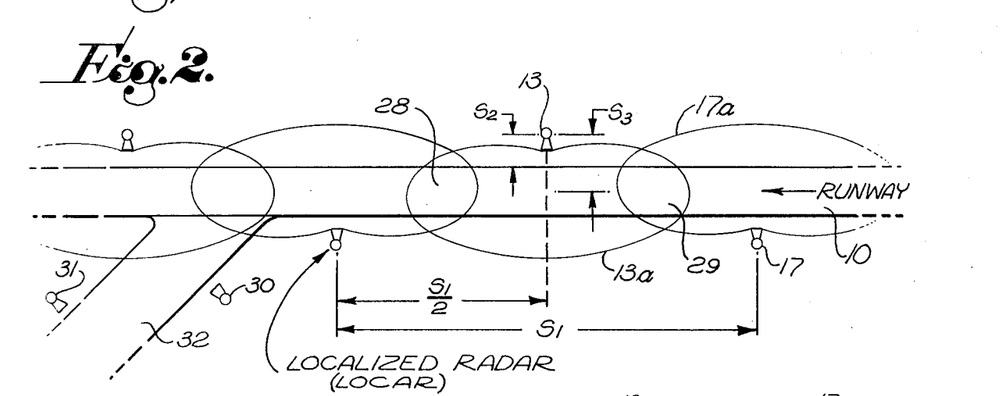
FIG. 2 is a plan view illustrating typical LOCAR unit radiation patterns.

Referring now to FIG. 2, a portion of the runway 10 is illustrated to show the overlapping patterns of the individual LOCAR units. It will be noted, in particular, that the individual LOCAR patterns are overlapping. Typically, an area 29 will be seen to be overlapped by patterns 17a and 13a from LOCARS 17 and 13, respectively. The significance of this overlap will be apparent as this description proceeds.

In both FIGS. 1 and 2, the physical spacings S1, S2 and S3 are illustrated. In a typical embodiment, these spacings could be on the order of 600 feet for S1, 50 feet for S2 and 50 feet + ½ of the runway width for S3, for a 0.1 microsecond transmitted pulse width.

On FIG. 2 an arbitrary taxiway 32 is shown joining runway 10. The programming of the LOCARS 30, 31 and the remainder of the LOCARS extending along 32, possibly leading to a parking area or terminal point, would be programmed in order in the series relationship spoken of in connection with runways 10 and 11. That is, at sometime during the interpulse period of the master timing pulses introduced at 25, elements 30, 31, etc. would be caused to blink.

An arbitary, but typical pulse repetition frequency for a system in accordance with the present invention, would be on the order of 1,000 Hz. Thus, there is an interpulse period of 1,000 in microseconds between adjacent master timing pulses, a sufficient time to permit the serial scan by means of successively blinking LOCARS along a number of programmed runways, taxiways, etc. on a given airport surface.

It will be noted that frequency sumbols $f1$, $f2$, $f3$, $f4$, etc. up to $f10$, are associated with the individual corresponding LOCARS 12, 17, 13, 18, etc. Typically, there are 10 different LOCAR frequencies used to provide a type of frequency staggering. All large airports have the typical parallel runway configuration and also have various buildings, towers, etc. located near the runways. Thus, there is a "late return" or "second time around" echo problem inherent in a system according to the present invention. To avoid this problem, the frequency staggered system is used. All LOCARS to the left of the runway are arbitrarily placed below center reference frequency and all those to the right side are above center reference frequency (the order may be reversed). The sequence of 10 different frequencies falls within the video bandwidth required for the selected transmitted pulse, namely, a band of approximately 16 MHz. As the transmitted pulse returns from LOCAR 12 (operating at f1) into the horn of LOCAR 13 (operating at f3), no indication is obtained since LOCAR 13 does not respond to $f1$, but only to its own frequency f3.

It will be noted, that in accordance with the typical spacings and parameters mentioned, 35 individually sequenced LOCARS blinking at 0.5 microsecond intervals, would cover a typical runway on the order of 2 miles long. Only 17.5 microseconds would be utilized out of the total of available 1,000 microsecond interpulse periods for covering such a runway. Accordingly, the next interval, which may be more or less than the 17.5 microseconds aforementioned, could be used for the next runway or taxi ramp, depending upon the airport configuration, and the most efficent cable layout for the particular airport concerned. From this, it will be apparent that discrete time intervals within the said interpulse periods are discretely associated with the various runways, taxiways, etc.

A combination of factors control the resolution obtainable with the system according to the present invention. Most of the conventional parameters, including pulse width, range gating and antenna patterns apply. One additional aspect of the present system, not commonly encountered, is the antenna pattern overlap.

In order to obtain digitized resolution, a pulse of 0.1 microseconds has been arbitrarily selected as typical for the LOCAR transmission pulse width. From this, comes the requirement that the LOCAR be spaced approximately 50 feet (i.e., S2 = 50 feet) from the edge of the runway.

Figure 3:
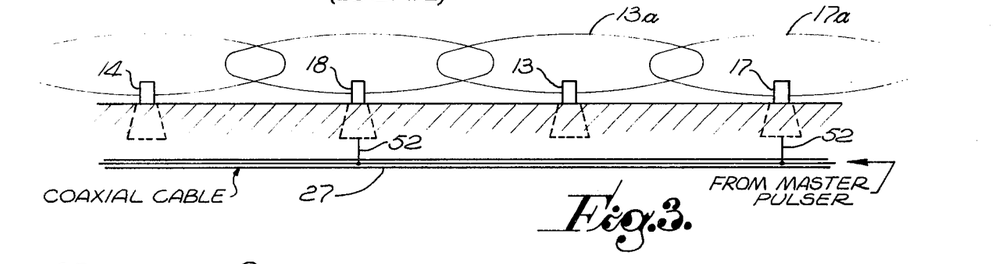
FIG. 3 is an elevation view showing typical LOCAR radiation patterns.

FIG. 3 is a self-explanatory elevation view of substantially the same situation as depicted in FIG. 2 and may be considered in connection with the foregoing discussion of FIG. 2. In addition, however, FIG. 3 shows the runway (left side) cable 27 as parallels runway 10 in FIG. 1.

Figure 4:
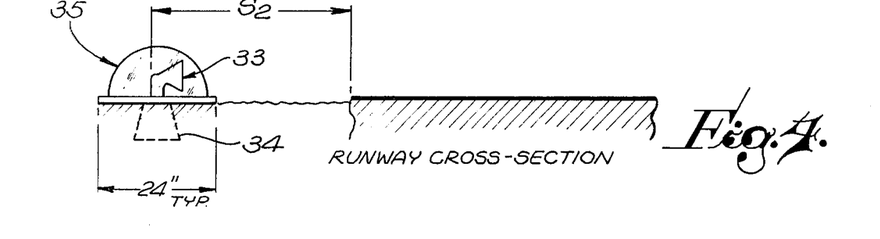
FIG. 4 is an elevation view of a typical LOCAR unit in place along-side a runway.

FIG. 4 is also self-explanatory, showing a typical LOCAR installation at any of the points 12, etc. from FIG. 1. A rectangular aperture horn 33 is provided, since it is simple and can readily produce the horizontal and vertical patterns of FIGS. 2 and 3. The individual LOCAR electronic circuitry in the block 34 will be described in detail in connection with FIG. 7 hereinafter. A typical plastic radome 35 protects the LOCAR unit and minimizes the hazard to aircraft and other vehicles which are, for any reason, off the runway or ramp at any time.

Figure 5:
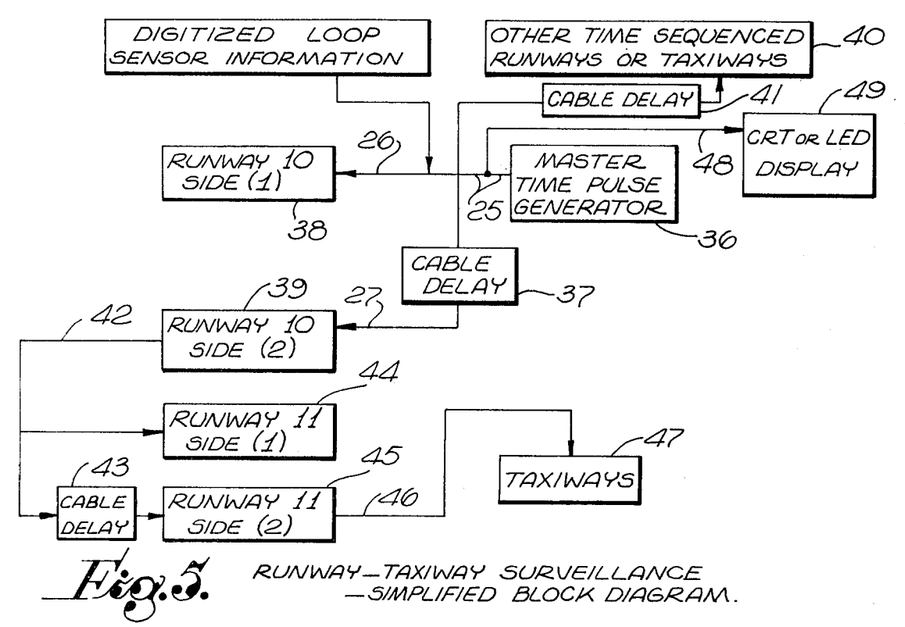
FIG. 5 is a block diagram of the overall system in accordance with the present invention.

Referring now to FIG. 5, a system block diagram is shown. The so-called master timing pulse at the system pulse repetition frequency is produced by master time pulse generator 36. The output lead 25 generally corresponds to that depicted in FIG. 1, and here the trigger pulses (typically spaced 1000 microseconds as aforementioned) appear. The individual runway sides depicting the LOCARS on the respective sides of runway 10, for example, as represented by blocks 38 and 39. The cable delay 37 represents the difference in length of cables 26 and 27 proceeding from point 25 to LOCARS 12 and 17, respectively. Other time sequenced runways or taxiways are illustrated by the block 40, and it is to be understood that cable delay 41 is that which is appropriate to place such other runway or taxiway in its proper time "slot" within the pulse repetition interval of the system. The last LOCAR to blink in connection with runway 10 would be the last one on the left side (side two which includes LOCARS 17, 18, 19, etc.). From this, a cable continuation 42 connects to side one of runway 11. The function of cable delay 43 will be readily understood from the foregoing discussion of cable delay 37. That is to say, that there would be a cable length difference between the excitation of LOCARS 22 and 24, and that cable delay or time differential is represented by 43. The right (side 1) LOCARS of runway 11 are represented at 44 and the left, or side 2, elements by 45. A cable 46, from the last element to blink in the sequence for runway 11 (that element being on the left or side 2) proceeds at 46 typically to other taxiways, etc. represented by block 47.

Figure 5A:
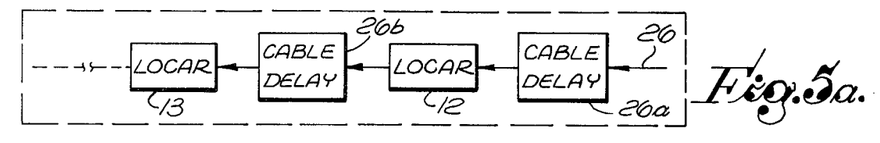
FIG. 5a is a detail of certain blocks of FIG. 5.

Each of the blocks 38, 39, 44 and 45 contains the individual elements shown in more detail in FIG. 5a. Thus, for example, if it is assumed that the typical showing of FIG. 5 is described in connection with the right, or side 1 elements of runway 10, the first two LOCARS are 12 and 13 and the connecting cable inherent delays through 26a and 26b are as represented.

Figure 6:
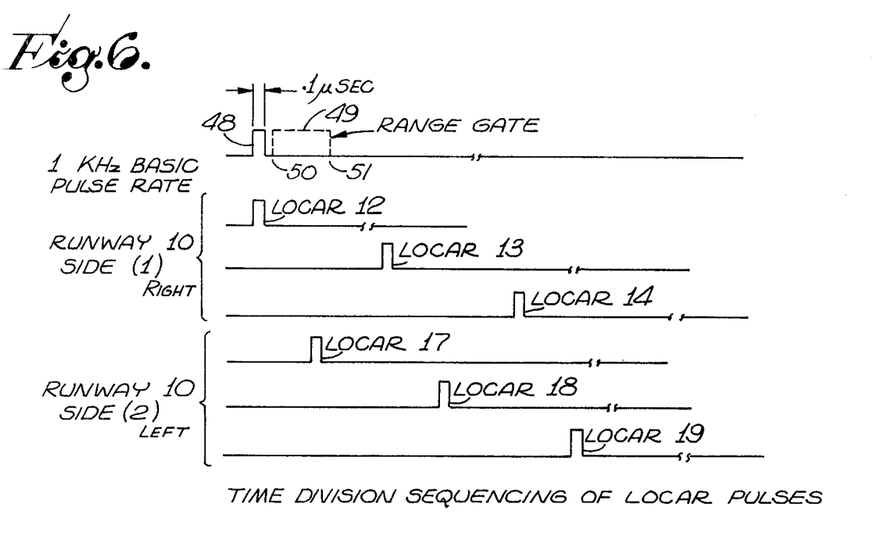
FIG. 6 is a waveform diagram showing typical pulse transmission time relationships applicable to FIG. 5.

FIG. 6 indicates the blinking or time sequencing of LOCAR pulses for a more graphic understanding. If pulse 48 on FIG. 6 is taken to be any arbitrary LOCAR timing pulse, or corresponding RF transmitted pulse, it will be noted that a block of time 49 is set aside corresponding to a range gate beginning at point 50 which is near the edge of the runway in each case and ending at 51 which is the far edge of the runway in each case. The remainder of FIG. 6 graphically illustrates the transmitted pulse locations for each LOCAR as identified. These pulses are readily associated with the configuration of FIG. 5 and with FIG. 1.

The remainder of FIg. 5 will be explained later in this description.

Figure 7:
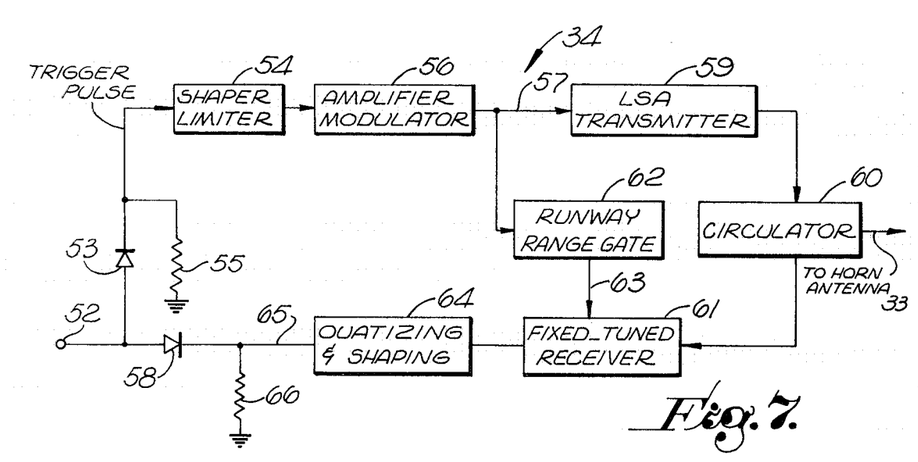
FIG. 7 is a detailed block diagram of a typical LOCAR unit.

Referring now to FIG. 7, the circuit of the individual LOCAR unit is depicted. The blocks illustrated in FIG. 7 generally correspond to the circuitry in 34 of FIG. 4. In each LOCAR unit, a common input-output terminal 52 is utilized. The snychronizing pulse from unit 36 of FIG. 5 passes through diode 53, but not diode 58. The impedance 55 serves to provide impedance matching for the connection of 52 at the junction with the cable in each case. Thus, the trigger pulse applied to the shaper-limiter 54 and amplifier-modulator 56, is formed into a power pulse of the desired rectangular characteristics to be used as a transmitter-modulator pulse. The nature of such circuits as 54 and 56 is well understood in these arts. The output pulse on lead 57 from amplifier-modulator 56 is applied to LSA transmitter 59. Since the individual LOCAR units operate over very small ranges, comparatively little microwave power is required from each LOCAR unit. A very practical unit for the transmitter 59 can be provided through the use of a Galium Arsenide microwave power generating diode, sometimes referred to as an LSA (Limited Space Charged Accumulation Mode)

diode. This so-called LSA diode is a solid state device, requiring no heater power or other auxiliary voltages as would be the case with magnetron or klystron circuits or the like. The LSA diode is a particularly attractive solid state microwave generator from another point of view in that it is stable and reliable and its internal parameters do not affect frequency. Accordingly, the tuned external circuits determine the frequency of oscillation. It follows that, when these external circuits are made stable, they will form a stable oscillator in combination with the LSA diode.

There are other devices, such as the so-called Gunn diode, which are relatively attractive as microwave generators in a system according to the present invention. These, as well as the LSA devices, are well known to those skilled in these arts.

A circulator, or hybrid circuit 60, channels the microwave pulse output from 59 to the horn antenna 33 (See FIG. 40 4) a well-known manner. Similarly, echo energy received at the horn 33 is passed by the circulator 60 to the fixed-tune receiver 61. Here again, some of the simplest radar receiver technology is applicable. Since the range is very low, such receivers as the crystal video type with cavity tuning, could be expected to perform satisfactorily in the receiver block 61. Solid state circuits are again appropriate for this circuit 61, in order to maximize the operational reliability and minimize the maintenance required.

Runway gate generator 62 is the device which produces the range gate 49 illustrated on FIg. 6. This device generates a rectangular enabling gate which is applied via lead 63 as a gain controlling function to receiver 61. Thus, receiver 61 is only capable of receiving echo signals during the enabling gate applied at 63. The actual width of the gate in feet (distance equivalent) is selectable to accommodate runways or approach ramps, taxiways, etc. of various widths. A range of adjustment of this enabling gate running between 50 and 300 feet would be nominal and typical.

In accordance with the foregoing, it will be realized that the output of the receiver 61 contains only signals during the range enabling gate applied at 63. The quantizing and shaping circuits 64 amplify and may provide a minimum threshold for signals passed to its output lead 65. Also, circuit 64 includes an inverter circuit if the output pulses of the receiver 61 are positive. The polarity of pulses from 61 is, of course, a matter of design; accordingly, it is possible to provide negative going signals as outputs from 61, in which case the circuit 64 need not include an inverter. Suffice it to say the signal at 65 is the second signal illustrated in the signal pair of 58, the first signal being that applied at 52 from the cable at the particular location. Another matching impedance 66 applies to the negative signals which pass through diode 58 and onto the line 52, but not back through diode 53, to provide a suitable driving source impedance in the reverse direction.

Figure 8:
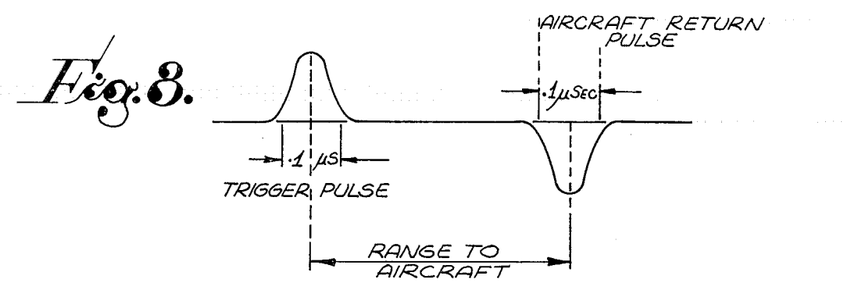
FIG. 8 is a waveform diagram of typical individual LOCAR transmit and receive pulses.

From FIG. 8, it will be realized that the time of occurrence of the second pulse, after the first, depends not only upon the cable distance but also upon the lateral distance from the vehicle on the runway to the LOCAR unit in each case. The negative received signal pulse travels backwards through the cable which supplies the snychronizing pulses from unit 36. An extension of this cable 48 (refer back to FIG. 5) carries the negative going signals to the control display unit 49 which do not act as triggers for any other LOCAR units. Similarly, transmitter triggering pulses of positive polarity are accepted to synchronize the unit 49.

As has been indicated before, the scan of each runway by the unique LOCAR blinking or sequencing operation described places data from each runway in a discrete range bin within each pulse repetition interval of the system. From knowledge of that basic fact, a straightforward cathode-ray display may be provided to present the data of FIG. 9. The system synchronizing pulse has a typical pulse repetition frequency of 1000 Hz if used as a sweep synchronizing signal. The cathode-ray display would be of the sequence type, as known in the radar arts, and that device is inherently accurate and capable of showing a maximum amount of information. For example, in the upper left-hand corner of FIG. 9, a representative piece of ancillary data (comprising an under-and-over speed alarm may be presented. In the upper right-hand corner any particular flight could be discretely identified by means of a closed circuit interrogation loop including the LOCAR units and an airborne transponder.

Figure 9:
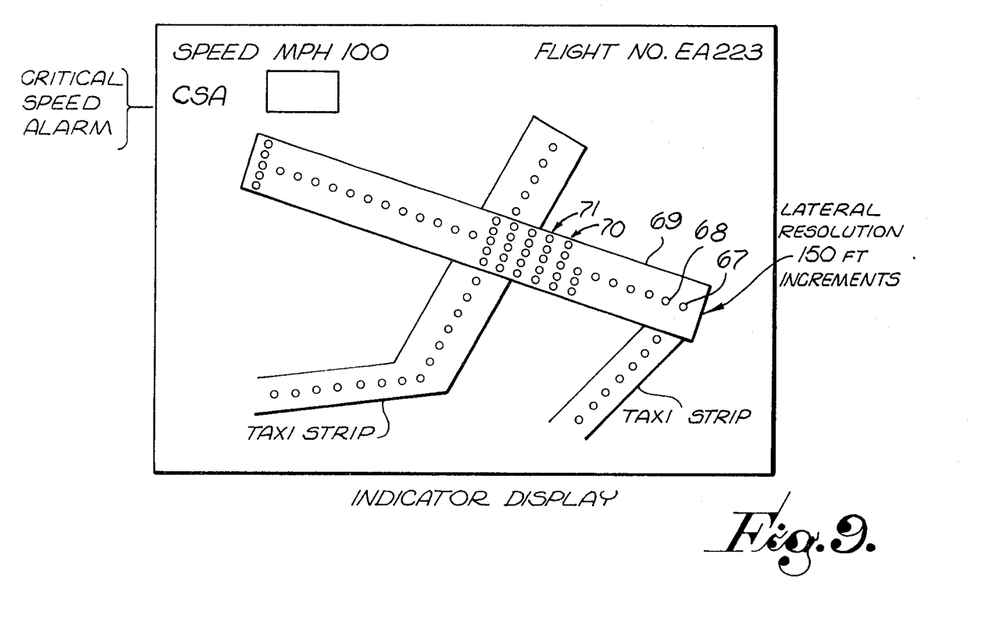
FIG. 9 is a typical display of LOCAR derived data in accordance with the present invention.

A simpler and less expensive type of display, which in many respects is ideally suited as part of the present LOCAR system, involves the use of miniature LED's (light emitting diodes) arranged as individual resolution elements on a map to simulate all resolvable positions on the complete airport surface in accordance with FIG. 9. It should be pointed out that on FIG. 9, LED elements 67 and 68 might be the first two center resolution elements for the first two LOCARS along a runway arbitrarily depicted at 69. Actually, there are a plurality of lateral resolution increments across the runway at each LOCAR position, as depicted at range positions 70 and 71.

In the LED display, each of the positions 70 and 71 would comprise 5 (an arbitrary number) LED's corresponding to a center of the runwway position and two degrees of variation on each side of center.

The manner in which the LED display is instrumented electronically will now be described with reference to FIG. 10. Briefly referring back to FIG. 1, it will be realized that the discrete time position of any pulse received by any of the LOCARS of that figure is variable in accordance with the lateral as well as longitudinal position on the runway or taxiway of the vehicle producing the said echo. The circuit of FIG. 10 exploits that fact for display purposes.

It will be assumed that the two rows of LED's comprising 85, 86, 87, 88 and 89 on the one hand, and 100, 101, 102, 103 and 104 on the other hand, correspond respectively to two arbitrarily selected LED positions on the display FIG. 9, for example, 70 and 71. The illumination of two longitudinally adjacent LED's indicates vehicle presence in one of the LOCAR pattern overlaps (See 28 and 29, FIG. 2).

Figure 10:
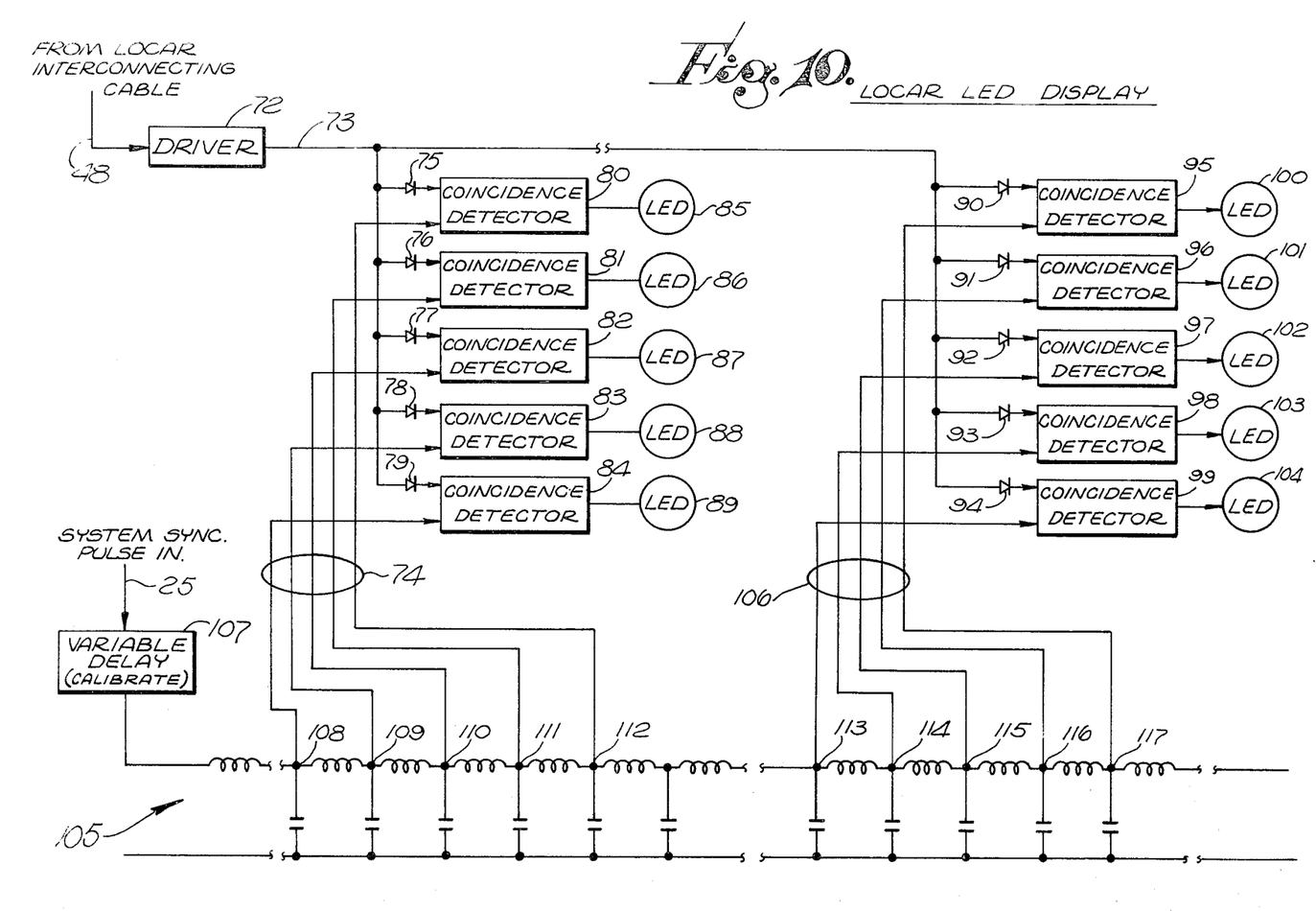
FIG. 10 is a detailed block diagram of a form of LOCAR display unit.

On FIG. 10, the system synchronizing pulse 25 on line 25, as shown on FIG. 5, and also the LOCAR interconnecting cable 48 (as it connects to the display) will be immediately recognized. The said synchronizing pulse on 25 is applied first to a variable delay 107 for calibration purposes and then to an artificial transmission line or delay line 105. This delay line is constructed to have an electrical length equal to the total length of the runways, taxiways, etc. which are subjected to surveillance in series in accordance with the present invention. Therefore, its total electrical length is some predetermined fraction of the 1,000 microsecond interpulse period. It will be noted that a plurality of discrete taps are made along the delay line 105. These taps are in groups of 5, separated by incremental delays equal to the lateral echo delay at any LOCAR position along the runway, as described in connection with FIG. 9. If it is arbitrarily assumed, for example, that the delays of the master pulse exhibited at taps 108, 109, 110, 111 and 112 correspond discretely to the five lateral positional variations possible at say, position 70 on FIG. 9, then this group of leads generally identified as 74, carries pulses to the coincidence circuits 80, 81, 82, 83 and 84 to produce illumination of the corresponding LED 85, 86, 87, 88 or 89 when the return receive pulse corresponding to that discrete delay occurs on the line 48. Since there are a number of coincidence and LED combinations, each representing a discrete longitudinal resolution element (only two being illustrated typically on FIG. 10), a driver 72 is used to provide sufficient driving power. In real time, however, all pulses at 73 correspond to those on 48. The diodes 75, 76, 77, 78 and 79, corresponding to one set of coincidence and LED circuits as depicted on FIG. 19, provide isolation as may be required, so that unintended coincidence responses will not occur. Accordingly, LED 87 would be illuminated by an echo from a vehicle located in the center of the runway opposite the LOCAR corresponding to the position 70 of FIG. 9. Therefore, 86 and 85 would represent the degrees of variation on one side of center and 88 and 89 the same relative degrees of variation on the other side. The time delay variation between pulses corresponding to adjacent LED's in one line, for example, between LED 85 and 86, is, of course, much smaller than the time delay between LOCAR positions, for example 12 and 13, of FIG. 1. Thus, all five degrees of variation at any one longitudinal position measured along the center line of a runway or taxiway, are represented by pulses spaced within the delay between adjacent LOCAR units measured along the same runway centerline.

On FIG. 10, a second subcombination of coincidence circuits and LED's comprising 95, 96, 97, 98 and 99, and 100, 101, 102, 103 and 104, respectively, will be noted. The function of these circuits and their associated diodes, 90, 91, 92, 93 and 94, respectively, is identical with that already described for the circuits responding to the pulse lead package 74. If these latter circuits, which respond to the pulse lead package 106, are representative of oppositely disposed LOCARS, as for example, 12 and 17 on FIG. 1, then the significance of a left deviation can correspond to more or to less delay. Thus, the sense of the vehicle deviation within the width of the runway is reversed as between such oppositely disposed LOCARS. This matter is handled by reversal of the connections in the pulse lead package 106 as compared with those in 74. To make that abundantly clear, let it be assumed that LED 85 is in the group 70 and is the one nearest the top of the FIG. 9 in that group. LED 100 from the other group might then be the bottom one as viewed on FIG. 9 in the 71 group.

The description of the present invention thus far presented concerns only the detection and presentation functions of the present invention. As previously indicated, however, the system fulfills the requirement that it be adaptable to actual control of vehicles on the runways, taxiways, etc.

Figure 11:
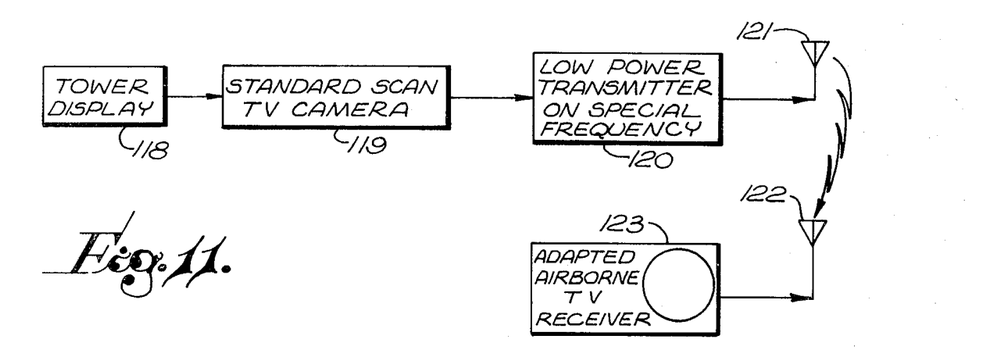
FIG. 11 is a block diagram of a CCTV arrangement for transmission of the ground display to a vehicle.

In FIG. 11, a method is depicted whereby the ground display information derived by the system of the present invention may be made available to the operator of a vehicle (particularly to the pilot of an aircraft on the runway or taxiway) in visual form. In FIG. 11, block 118 represents a tower display such as has been presented and described in FIG. 9. This display is viewed by a standard scan television camera 119 which modulates a low-powered transmitter 120. A selected frequency, possibly in or above the UHF range, may then be devoted to the transmission of a televised picture of the said tower display through antenna 121 to be picked up by antenna 122 on board the aircraft or other vehicle. From there, a standard television receiver, possibly adapted from weather radar indicator equipment, etc., provides the actual visual display. Ordinary roster scanned CCTV is acceptable for this function, however.

Another major aspect of the present invention is its adaptability to the automatic control of a vehicle on the runway or taxiway.

Figure 12:
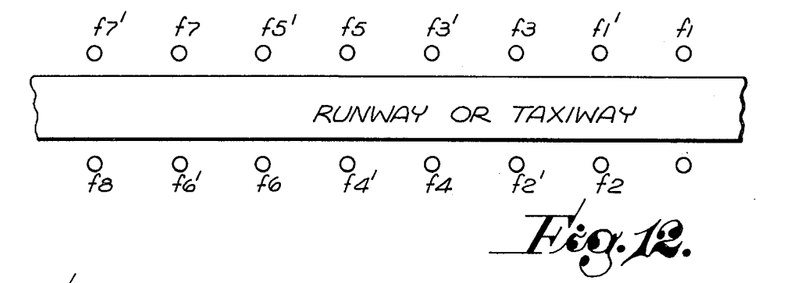
FIG. 12 is a runway LOCAR arrangement for providing lateral position data from a LOCAR display.
Figures 13, 14:
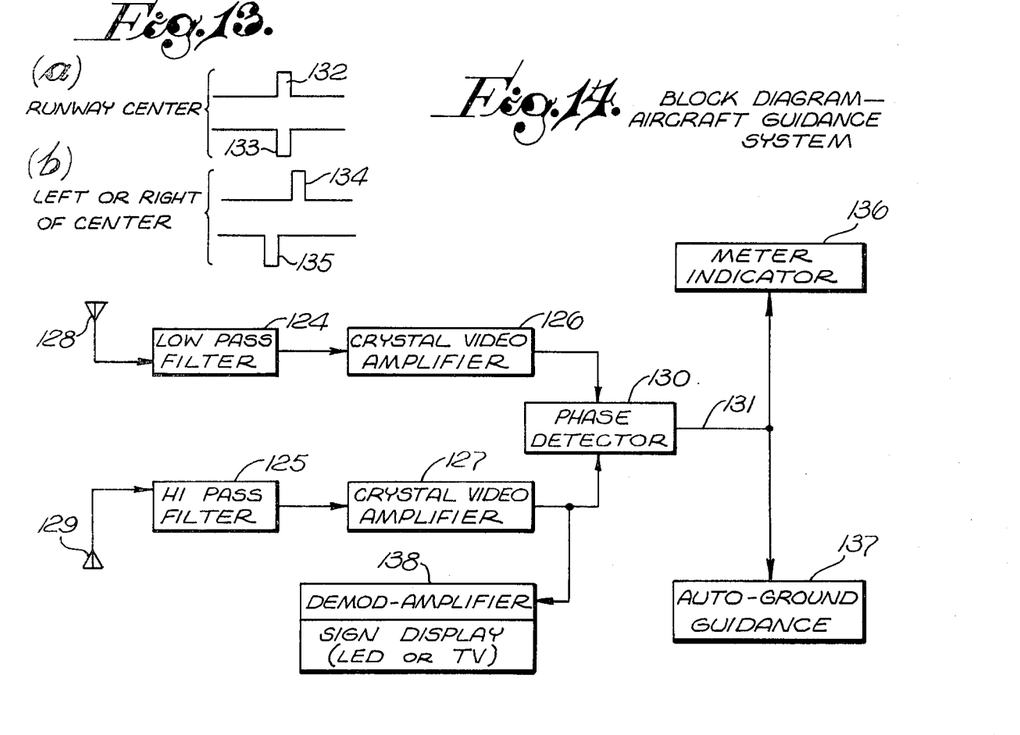
FIG. 13 is a waveform diagram depicting the relationship of opposite LOCAR pulses, in accordance with FIG. 12, as received at the vehicle.
FIG. 14 is a functional diagram illustrating guidance and control functions for use with the system of the present invention with relation to FIGS. 12 and 13.

Consider, at this time, FIG. 12; this drawing depicts the addition of an additional interlaced transmit only LOCAR units. The arrangement of FIG. 11 is fundamentally the same as FIG. 1 with the exception that an interlaced set of "transmit-only" LOCAR units is interposed between the LOCAR emplacements depicted in FIG. 1. In FIG. 12, these additional transmit-only emplacements are identified by prime marks. For example, $f_1'$ is between $f1$ and $f3$ which are LOCAR units 12 and 13, respectively on FIG. 1. The unit at $f_1'$ transmits on the same frequency as $f1$. The same is true of all the other f' emplacements in that they operate on the same frequency as their subscript companion contemplated on FIG. 1. The same cable arrangement, i.e., that of 26 and 27, as envisioned in FIG. 1, applies to the configuration of FIG. 12. It will be seen, however, that the number of blinks is doubled, and that opposite emplacements blink contemporaneously. Referring now to FIGS. 13 and 14, the functional aspects of the arrangement will be explained in terms of the structure necessary. If it is assumed from FIG. 12 that the LOCAR emplacements on one side of the runway are slightly shifted in frequency, with respect to those of the other side, without deviating from the bandpass characteristics of the equipment already described, it will be seen that a relatively simple detecting device according to FIG. 14 can provide automatic directional control on the airport surface. For this purpose, as shown on FIG. 14, high and low pass filtering via units 125 and 124, respectively, each with a corresponding crystal video detector 126 and 127, respectively, can process LOCAR pulses from left and right antennas 128 and 129, respectively. These antennas 128 and 129 are extremely simple and may consist only of a quarter-wave stub or half-wave dipole flush-mounted at a convenient point within the aircraft wing or fuselage surface according to well-known techniques. Since the operating frequency of the LOCAR units might be 3,000 or more MHz, the antennas are very small. A phase detector 130 thus receives detected LOCAR pulses from each side of the runway or taxiway and compares them to produce a DC output voltage. Considering now also FIG. 13, it will be evident that FIG. 13($a$) represents the pulse inputs to phase detector 130 if the aircraft or other vehicle is equi-distant between the LOCAR emplacements, i.e., essentially in the middle of the runway or taxiway. In this situation, the output of phase detector 130 and 131 would be zero, i.e., pulses 132 and 133 are equal and opposite and cancel each other. In FIG. 13(b), pulses 134 and 135 produce an output of one polarity on 131 and of the opposite polarity in the situation where pulse 134 occurs at an earlier time then 135. Meter indicator 136 can be instrumented in the same manner as the localizer portion of the familiar ILS cross-pointer indicator. The same output 131 may be applied to an automatic ground guidance subsystem 137, which operates a servo-mechanism for actual control of aircraft surface direction, i.e., by such means as controlling the nose wheel steering of an aircraft. This system constitutes a closed control loop so that once the aircraft is automatically steered back to the runway centerline, the error signal and therefore the control function is zeroed out.

Once the principles of the present invention are well understood, it will occur to those skilled in this art that the discrete data bits representing the block occupancies, as illustrated on FIG. 9 by LED positions, can provide the basis of computer storage and processing for various traffic control and safety purposes.

Another "fallout" feature of the system of the present invention involves the discrete and selected modulation, as for example, (by FM or otherwise) of any of the LOCAR emplacements. On board an aircraft, this modulation may be readily detected and used to activate a warning sign or other discrete operation on board the aircraft as illustrated at 138 on FIG. 14. That sign might be simply a stop order from the traffic controller. Such pieces of discrete information may be transmitted with modulation rates as low as 400 Hz bandwidth or even lower.

The system described will be recognized as completely compatible with such current devices as aircraft transponders, etc. and does not interfere with ordinary ground-to-air communication or with navigation or landing approach devices.

The word "runway" is defined, as used in the claims, as including taxiways, etc., i.e., all paths useful for aircraft surface movement and movement of surface vehicles.

Various modifications and additional adaptations of the present invention will suggest themselves to those skilled in this art, in addition to those briefly hereabove discussed. Accordingly, it is not intended that the specific showings of the drawings, and this description should be regarded as defining the limits of the inventive concepts. The drawings and this description are intended to be illustrative and typical only.

What is claimed is:

1. A system for airport surface traffic control on at least one runway, comprising:
    a plurality of low-power pulsed transmit-receive radar devices spaced along a line parallel to and laterally offset from said runway, each of said devices having a transmit-receive pattern extending over a discrete portion of said runway and each being responsive to timing pulses to transmit corresponding short microwave pulses contemporaneously;
    a timing pulse generator for generating timing pulses of a first polarity at a predetermined PRF;
    transmission line means connected from said pulse timing generator to supply said pulses to said radar devices serially in a predetermined order, the time of arrival of said timing pulses at each of said radar devices being determined by the length of said transmission line thereto from said timing pulse generator;
    reception means within each of said radar devices for receiving echo signals corresponding to said microwave pulses and for sending said echo signals in a second polarity into said transmission line; and
    display means connected to said transmission line at a point removed from said radar devices and connected to be synchronized by said timing pulse generator and to visually display the positional data represented by said echo signals.

2. Apparatus according to claim 1 further defined in that each of said radar devices transmits and receives on a frequency separated from any other of said radar devices having a radiation pattern at least partially overlapping its own radiation pattern.

3. The invention according to claim 1 in which said radar devices are spaced along lines parallel to and laterally offset from each side of said runway being spaced by equal increments measured along said lines parallel to said runway on each side thereof, said radar devices further being staggered so that each is located at a position substantially equi-distant from the nearest two radar devices on the opposite side of said runway and said transmission line being arranged such that said radar devices transmit corresponding pulses alternately from both sides of said runway in order of increasing distance along the centerline of said runway.

4. Apparatus according to claim 3 in which said reception means includes means responsive to said timing pulses for enabling reception of said echo signals substantially only within a range gate corresponding to a predetermined lateral distance with respect to said runway.

5. Apparatus according to claim 4 in which said range gate corresponds substantially to the width of said runway.

6. Apparatus according to claim 4 in which said display means comprises a sequenced cathode ray display.

7. Apparatus according to claim 4 in which said display means comprises a plurality of light emitting diodes arranged in a map-like pattern in which each resolution element in the general direction of said runway and laterally thereto is represented by a discrete one of said light emitting diodes; said display means comprises delay means having a plurality of outputs, each of which corresponds to one of said light emitting diodes, each of said delay means outputs providing pulses representative of the time position within the interval between successive ones of said timing pulses of a discrete corresponding resolution element on said map-like pattern; and means comprising a plurality of circuits responsive to said delay means outputs and said echo signals on said transmission lines for activating said light emitting diodes at positions corresponding to said echo signal corresponding time positions within said interval between successive timing pulses.

8. Apparatus according to claim 3 in which said radar devices each include a horn antenna directed toward said runway with the axis of said horn being substantially normal to the centerline of said runway, said horns being further defined as producing a radiation and reception pattern substantially confined to predetermined azimuth and elevation angles whereby said pattern for each of said radar devices partially overlaps that of the nearest two radar devices on the opposite runway side.

9. Apparatus according to claim 8 in which said radar devices each include an LSA transmitter and a fixed tuned receiver connected to said horn antenna through a circulator and each of said radar devices includes a terminal connected to said transmission line and two oppositely poled diodes connected thereto, one of said diodes forming a signal isolating connection to said transmitter responsive to said timing pulses of said first polarity and the other diode forming a signal isolation connection to send said echo signal from said receiver into said transmission line.

* * * * *